US011472499B2

(12) United States Patent
Jiang et al.

(10) Patent No.: US 11,472,499 B2
(45) Date of Patent: Oct. 18, 2022

(54) CHASSIS OF AUTOMATIC GUIDED VEHICLE AND AUTOMATIC GUIDED VEHICLE

(71) Applicant: Hangzhou Hikrobot Technology Co., Ltd., Zhejiang (CN)

(72) Inventors: Hui Jiang, Zhejiang (CN); Chao Wu, Zhejiang (CN); Wangbiao Lv, Zhejiang (CN); Wentao Yu, Zhejiang (CN)

(73) Assignee: Hangzhou Hikrobot Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/278,911

(22) PCT Filed: Sep. 17, 2019

(86) PCT No.: PCT/CN2019/106232
§ 371 (c)(1),
(2) Date: Mar. 23, 2021

(87) PCT Pub. No.: WO2020/063402
PCT Pub. Date: Apr. 2, 2020

(65) Prior Publication Data
US 2021/0394842 A1 Dec. 23, 2021

(30) Foreign Application Priority Data
Sep. 30, 2018 (CN) .......................... 201821611921.1

(51) Int. Cl.
*B62D 61/10* (2006.01)
*B62D 21/18* (2006.01)
(Continued)

(52) U.S. Cl.
CPC ............. *B62D 61/10* (2013.01); *B62D 21/18* (2013.01); *B62D 63/04* (2013.01)

(58) Field of Classification Search
CPC ........ B62D 61/10; B62D 21/18; B62D 63/02; B62D 63/04; B62D 21/14; B62D 21/15; B62D 21/152; B65G 47/00
See application file for complete search history.

(56) References Cited

U.S. PATENT DOCUMENTS

2017/0144502 A1    5/2017 Bae et al.

FOREIGN PATENT DOCUMENTS

| CN | 1544280 A | 11/2004 |
| CN | 101804840 A | 8/2010 |
| (Continued) | | |

OTHER PUBLICATIONS

Description Translation of CN 207015475 from Espacenet (Year: 2018).*

*Primary Examiner* — James A English
*Assistant Examiner* — Daniel M. Keck
(74) *Attorney, Agent, or Firm* — Bret E. Field; Bozicevic, Field & Francis LLP (57) ABSTRACT

Disclosed are a chassis of an automated guided vehicle and an automated guided vehicle. The chassis includes a front frame (1) and a rear frame (2) that are engaged with each other in a hinged joint manner, so as to allow a relative folding between the rear frame (2) and the front frame (1). The relative folding enables the driving wheels and the driven wheels to touch the ground on a sunken road at the same time to prevent that only the driven wheels (10) touch the ground while the driving wheels (9) slip, and increases the approach angle of the chassis on a convex road to prevent the front end of the chassis from touching any obstacle, which improve the safety of the vehicle. Moreover, the damping device (3) restricts the folding angle of the front frame (1) and the rear frame (2) to prevent that the relative folding angle of the front frame (1) and the rear frame (2) is (Continued)

too large to realize the transport function, and damps the folding angle for reducing vibration.

11 Claims, 8 Drawing Sheets

(51) Int. Cl.
*B62D 63/04* (2006.01)
*B62D 63/02* (2006.01)
*B65G 47/00* (2006.01)

(56) References Cited

FOREIGN PATENT DOCUMENTS

| | | | |
|---|---|---|---|
| CN | 105730553 A | | 7/2016 |
| CN | 106081164 A | | 11/2016 |
| CN | 107351940 A | * | 11/2017 |
| CN | 107554646 A | | 1/2018 |
| CN | 207015475 U | | 2/2018 |
| CN | 108263509 A | | 7/2018 |
| CN | 108527333 A | | 9/2018 |
| CN | 109383662 A | | 2/2019 |
| CN | 209321102 U | | 8/2019 |
| KR | 10-2017-0010184 A | | 1/2017 |
| WO | WO2018107674 A1 | | 6/2018 |

\* cited by examiner

CHASSIS OF AUTOMATIC GUIDED VEHICLE AND AUTOMATIC GUIDED VEHICLE

The present application claims the priority to a Chinese patent application No. 201821611921.1 filed with China National Intellectual Property Administration on Sep. 30, 2018, and entitled "CHASSIS OF AUTOMATIC GUIDED VEHICLE AND AUTOMATIC GUIDED VEHICLE", which is incorporated herein by reference in its entirety.

TECHNICAL FIELD

The present application relates to the technical field of automated guided vehicles, and particularly relates to a chassis of an automated guided vehicle and an automated guided vehicle.

BACKGROUND

An automated guided vehicle (AGV) is referred to a transport vehicle equipped with an electromagnetic or optical automated guided device and having various functions of safety protection and load transferring. The above-mentioned automated guided device is used for realizing travelling of the AGV along a preset guided path.

The chassis of the existing AGV is a chassis with an integral structure, on which two driven wheels are arranged at the front and at the rear, and two driving wheels are arranged in the middle. When the AGV with such chassis structure passes through an uneven road, the load would be loaded only by the driven wheels, or the proportion of the load carried by the driven wheels is large while the proportion of the driving wheels is small, which would cause the insufficient positive pressure on the driving wheels, leading to that the driving wheels slip and the AGV moves difficultly.

SUMMARY

In order to solve the above technical problems, the present application provides a chassis of an automated guided vehicle, including:

a front frame; and a rear frame, the rear frame and the front frame being docked in a hinge joint manner, so as to allow a relative folding between the rear frame and the front frame.

Optionally, the relative folding includes upwarping or downwarping of the front frame relative to the rear frame.

Optionally, the front frame and the rear frame are hinged in a towed manner.

Optionally, the chassis further incudes damping devices, the damping devices being arranged between the front frame and the rear frame to generate damping restraining force against the relative folding.

Optionally, the front frame and the rear frame have an overlap area at each docking point, in which a folding space for realizing the relative folding is reserved.

Optionally, one damping devices is located in the overlap area.

Optionally, the front frame is provided with one type of damping mounting boss and damping mounting arms, and the rear frame is provided with the other type of the damping mounting boss and the damping mounting arms;

each damping mounting arm overlaps one damping mounting boss, and the folding space is located between the damping mounting arm and the damping mounting boss; and one end of the damping device is fixed on the damping mounting arm, and the other end is fixed on the damping mounting boss.

Optionally, the damping device includes:

a limit shaft, the limit shaft penetrating the damping mounting arm and being threadedly connected with the threaded hole of the damping mounting boss, and being fixed by means of a backing plate; and cushions, the cushions including a first cushion and a second cushion;

wherein, the first cushion is located between the backing plate and the damping mounting arm, and the second cushion is located between the damping mounting arm and the damping mounting boss.

Optionally, the limit shaft includes:

a threaded portion, the threaded portion being threadedly connected with the threaded hole of the damping mounting boss;

a limiting boss, the limiting boss being located between the damping mounting arm and the damping mounting boss, and providing a placement plane for the second cushion; and a connecting portion, the connecting portion penetrating the damping mounting arm, and being fixed by means of the backing plate;

wherein, the connecting portion is provided with a threaded blind hole extending in its own axial direction and used for mounting a locking screw.

Optionally, a circular hollow is formed at the docking points of the front frame and the rear frame.

Optionally, the front frame and the rear frame are hinged by a pin shaft.

Optionally, the front frame is provided with one type of docking blocks and docking grooves, and the rear frame is provided with the other type of the docking blocks and the docking grooves;

each docking block is embedded in one docking groove; and the pin shaft penetrate the coaxial holes of the docking blocks and the docking grooves.

Optionally, each pin shaft has a pin and a connecting piece located at the end of the pin, wherein the pin penetrates the coaxial holes of the docking blocks and the docking grooves, and the connecting piece is fixed to the front frame or the rear frame.

The embodiments of the present application provide an automated guided vehicle, which includes the above-mentioned chassis of the automated guided vehicle.

It can be seen from the above technical solution that the chassis of the present application includes a front frame and a rear frame that are docked with each other and which are hinged. A relative folding can generate between the front frame and the rear frame. The relative folding enables the driving wheels and the driven wheels to touch the ground on a sunken road at the same time to prevent that only the driven wheels touch the ground while the driving wheels slip, and increases the approach angle of the chassis on a convex road to prevent the front end of the chassis from touching any obstacle, which improve the safety of the vehicle. Moreover, the damping device restricts the folding angle of the front frame and the rear frame to prevent that the relative folding angle of the front frame and the rear frame is too large to realize the transport function, and damps the folding angle for reducing vibration to prevent the damage to the chassis due to the excessive vibration when the folding generates on an uneven road.

BRIEF DESCRIPTION OF THE DRAWINGS

In order to explain the embodiments of the present application and the technical scheme of the prior art more clearly, the drawings used in the prior art and the embodiments will be described briefly in the following, and it is apparent that the drawings in the description below are only some embodiments of the present application and those skilled in the art can obtain other drawings according to these drawings without inventive efforts.

DETAILED DESCRIPTION OF THE INVENTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

In this article, "schematic" means "serving as an example or illustration", and any illustration or embodiment described as "schematic" in this article should not be construed as a more preferred or more advantageous technical solutions.

In order to make the drawings concise, each figure only schematically show the related parts of the present application, which do not represent the actual structure of the product. In addition, in order to make the drawings concise and easy to understand, in some drawings with the same structure or function, only one of them is schematically shown, or only one of them is marked.

In this article, "upper", "lower", "front", "rear", "left", "right", etc. are only used to indicate the relative position relationship between related parts, but not to limit the absolute position of these related parts.

In this article, "first", "second", etc. are only used to distinguish each other, rather than indicating the degree of importance and order, and the premise of mutual existence, etc.

In this article, "equal", "same", etc. are not strictly mathematical and/or geometrical limitations but include errors that can be understood by those skilled in the art and allowed for manufacturing or use. Unless otherwise specified, the numerical range in this article includes not only the entire range between its two endpoints, but also several sub-ranges contained therein.

Figure 1:
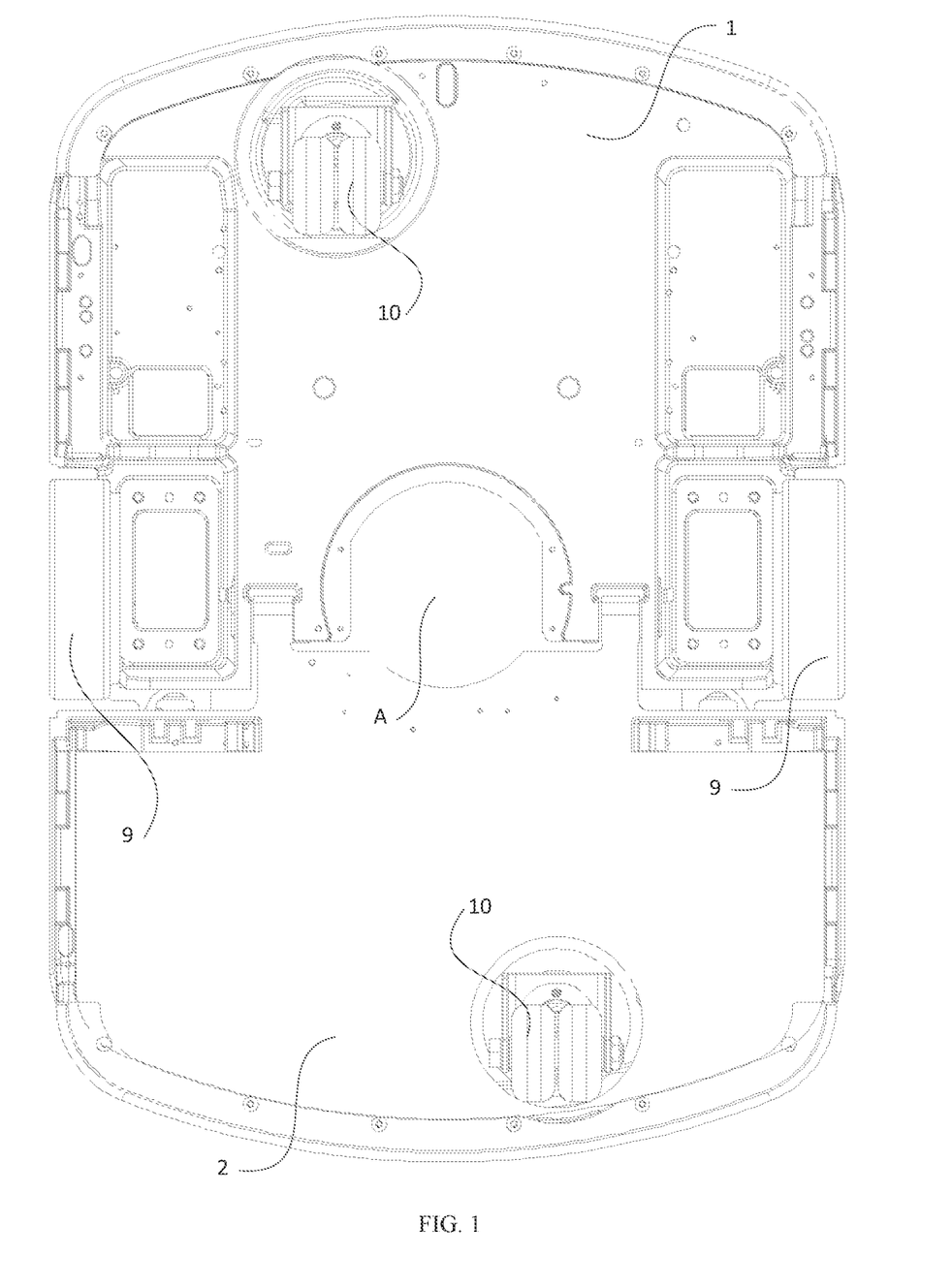
FIG. 1 is a schematic structural diagram of a chassis of an automated guided vehicle according to an embodiment of the present application.

In order to solve the technical problem in the prior art that the driving wheels of the automated guided vehicle cannot touch the ground and slipping due to insufficient positive pressure, as shown in FIG. 1, the embodiments of the present application provide a chassis of an automated guided vehicle, which includes:

a front frame 1; and a rear frame 2, the rear frame 2 engages with the front frame 1 in a hinge joint manner, so as to allow the rear frame 2 to be folded relative to the front frame 1.

The front frame 1 is located at the front end of the chassis, and the rear frame 2 is located at the rear end of the chassis. Two driving wheels 9 are respectively located at the two sides of the position at which the front frame 1 engages with the rear frame 2 and are symmetrically mounted on the front frame 1 or the rear frame 2. Two driven wheels 10 are symmetrically mounted on the front frame 1 and the rear frame based on the center of the chassis. When the vehicle is running, the driving wheels 9 and the driven wheels 10 cooperate to realize the smooth forward movement of the vehicle. The front frame 1 engages with the rear frame 2 in a hinge joint manner, and the front frame 1 and the rear frame 2 can be folded relative to each other, that is, the rear frame 2 is foldable relative to the front frame 1.

In the embodiment of the present application, the "front end" and the "rear end" refer to the relative position relationship of the front and rear of the automated guided vehicle. That is, the front end refers to the end near the front of the vehicle, and the rear end refers to the end near the rear of the vehicle.

The relative folding includes upwarping or downwarping of the front frame 1 relative to the rear frame 2, so that the driving wheels 9 and the driven wheel 10 of the front frame 1 and the driven wheel 10 of the rear frame 2 touch the ground at the same time. As such, the angle for upwarping or downwarping of the front frame 1 relative to the rear frame 2 is adjustable, such that the rear frame 2 is able to upwarp or dip down relative to the front frame 1. In such way, since the angle for upwarping or downwarping is adjustable, the driving wheels 9 and the driven wheels 10 can touch the ground at the same time on the uneven roads.

Reference to FIG. 1, the front frame 1 and the rear frame 2 can be hinged in a towed manner, and the front frame 1 does not cover the rear frame 2. In other words, the load-bearing surface of the front frame 1 does not overlaps with the load-bearing surface of the rear frame 2. As such, the front frame 1 and the rear frame 2 bear the load separately, and the rear frame 2 does not share the load of the front frame 1.

The chassis of the existing AGV includes a main frame and an auxiliary frame. The auxiliary frame is located in the frame of the main frame, and hinges with the main frame by a pin shaft, so that the auxiliary frame floats up when the driven wheels of the auxiliary frame encounter a bump on the ground, but the main frame does not float up, which reduces the ground clearance of the frames and the approach angle of the chassis, wherein the approach angle refers to a angle between the tangent line drawn from the projecting point at the front end of the vehicle to the driven wheel 10 located in the front and the ground. Thus, on uneven roads, it is easy to occur that the load is carried only by the driven wheels, or the proportion of the load carried by the driven wheels is large while the proportion of the driving wheels is small, which makes the positive pressure of the driving wheels insufficient, leading to that the driving wheels slip. In the present application, the rear frame 2 is not arranged in the front frame 1, and the front frame 1 is not provided with a frame that covers the rear frame. Instead, the front frame 1 and the rear frame 2 are hinged with each other in a towed manner. The front frame 1 and the rear frame 2 are load bearing separately. However, in the prior art, the auxiliary frame is located in the frame of the main frame, so that the main frame and the auxiliary frame cannot fold over relative to each other, can only perform positional jumps at a small angle, and thus the jump range between the main frame and the auxiliary frame cannot be adapted to the road surface with large unevenness. However, in the present application, a relative folding between the front frame 1 and the rear frame 2 can be performed. It can be understood that the relative folding refers to that there can be a position folding over between the front frame 1 and the rear frame 2 at a larger angle. When encountering a relatively flat road, the front frame and the rear frame can perform a folding at a small angle, and when encountering a road surface with large unevenness, the front frame and the rear frame can perform a folding at a larger angle, so the folding can be adapted to a wider range of road conditions.

Figure 2:
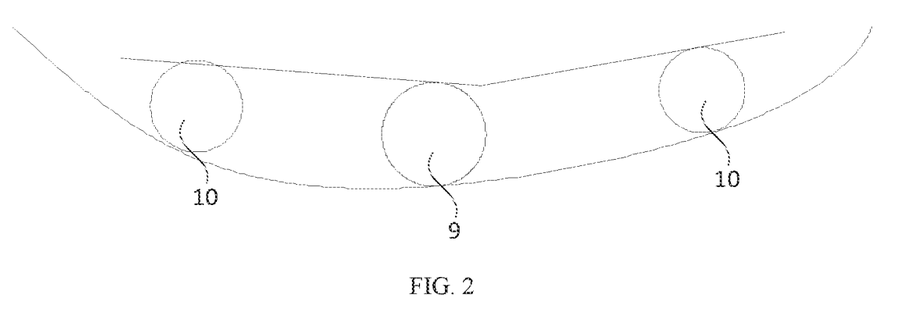
FIG. 2 schematically shows the folding of the chassis when the automated guided vehicle according to the embodiment of the present application is travelling on a sunken road.
Figure 3:
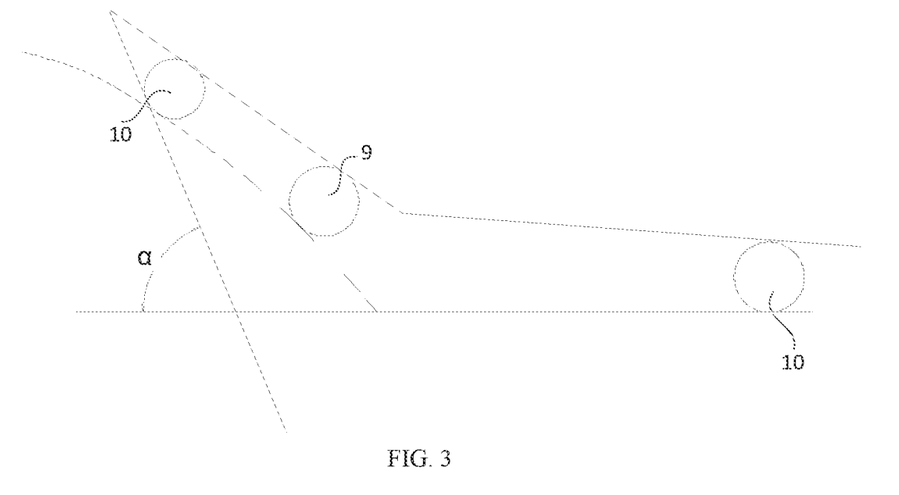
FIG. 3 schematically shows the folding of the chassis when the automated guided vehicle according to the embodiment of the present application is travelling on a convex road.

In a specific example, FIG. 2 is a schematic diagram of the folding of the chassis when the automated guided vehicle according to the embodiment of the application is running on a sunken road. When encountering a sunken road, the front frame 1 folds relative to the rear frame 2, which causes the chassis to form a bend that matches the depression, and then causes both of the driving wheel 9 and the driven wheel 10 touch the ground, enabling the driving wheels 9 and the driven wheels 10 bear the weight evenly, and thus avoiding the vehicle from slipping in place due to the driving wheels 9 leaving the ground. As shown in FIG. 3, which is a schematic diagram of the folding of the chassis when the automated guided vehicle according to the embodiment of the application is running on a convex road, when encountering a convex road, the rear frame is folded relative to the front frame to enable the chassis to form a bend that matches the protrusion, realizing that the front frame 1 floats up relatively along with the driven wheel 10. At this time, the approach angle α of the chassis will not be reduced by the float between the front frame 1 and the rear frame 2. On the contrary, when the vehicle is running on a convex road, the approach angle α increases due to the folding of the front frame 1 and the rear frame 2, so that the vehicle will not collide, and the safety of the vehicle will be increased.

The damping device 3 is located between the front frame 1 and the rear frame 2, which restricts the relative folding between the front frame 1 and the rear frame 2 to prevent that the relative folding angle between the front frame 1 and the rear frame 2 is too large to realize the transport function, and the damping device 3 damps the relative folding while achieving restriction for reducing vibration to prevent the damage to the chassis due to the excessive vibration when the folding is performed on an uneven road.

The chassis of the existing vehicle is a chassis with an integral structure, on which two driven wheels are arranged at the front and at the rear, and two driving wheels are arranged in the middle. When the vehicle with such chassis structure passes through an uneven road, it is easy to occur that the load is carried only by the driven wheels, or the proportion of the load carried by the driven wheels is large while the proportion of the driving wheels is small, which causes the positive pressure of the driving wheels insufficient, leading to that the driving wheels slip and the vehicle moves difficultly. In the embodiment of the present application, the chassis includes a front frame 1 and a rear frame 2 which are engaged with each other and the front frame 1 hinges with the rear frame 2. A relative folding can generate between the front frame 1 and the rear frame 2. The relative folding enables the driving wheels 9 and the driven wheels 10 to touch the ground on a sunken road at the same time to prevent that only the driven wheels 10 touch the ground while the driving wheels 9 slip, and increases the approach angle of the chassis on a convex road to prevent the front end of the chassis from touching any obstacle, which improve the safety of the vehicle. Moreover, the damping device 3 restricts the folding between the front frame 1 and the rear frame 2 to prevent that the relative folding angle of the front frame 1 and the rear frame 2 is too large to realize the transport function, and damps the folding angle for reducing vibration to prevent the damage to the chassis due to the excessive vibration when the folding is performed on an uneven road.

In one example, an overlap area is provided in a position at which the front frame 1 engages with the rear frame 2. A folding space D is provided in the overlap area for realizing the above-mentioned relative folding is reserved. The overlap area is a three-dimensional space at which the front frame 1 engages with the rear frame 2. In the overlap area, a part of the space is the blank space reserved for realizing the relative folding between the front frame 1 and the rear frame 2, that is, the folding space D.

It can be understood that if the front frame 1 and the rear frame 2 are to be folded relatively, there must be a folding space D provided for the relative folding. On one hand, the hinge joint of the front frame 1 and the rear frame can be realized in the overlap area, and on the other hand, the corresponding space for the relative folding of the front frame 1 and the rear frame 2 can provided in the overlap area to prevent the front frame 1 and the rear frame 2 from obstructing each other when they are folded.

The damping device 3 is located in the overlap area. It can be understood that the damping device 3, on one hand, realizes the restriction of the relative folding between the front frame 1 and the rear frame 2, and on the other hand, realizes vibration reduction. Therefore, the damping device 3 is arranged at the connection point between the front frame 1 and the rear frame 2. Each of the overlap areas between the front frame 1 and the rear frame 2 provides a mounting position for the damping device 3, which is beneficial to the mounting of the damping device 3.

In one implementation, the front frame 1 is provided with one of the damping mounting boss 7 and the damping mounting arms 8, and the rear frame 2 is provided with the other of the damping mounting boss 7 and the damping mounting arms 8; each damping mounting arm 8 overlaps one damping mounting boss 7, and the folding space D is located between the damping mounting arm 8 and the damping mounting boss 7; one end of the damping device 3 is fixed on the damping mounting arm 8 and the other end is fixed on the damping mounting boss 7. The front frame 1 and the rear frame 2 provide a mounting position for the damping device 3 with the stack of the damping mounting boss 7 and the damping mounting arm 8. One end of the damping device 3 is fixed by passing through the damping mounting arm 8 and the other end is fixed to the damping mounting boss 7, which realizes the connection of the front frame 1 and the rear frame 2. The damping device being located between the front frame 1 and the rear frame 2, realizes the restriction on the folding angle of the front frame 1 and the rear frame 2, and at the same time protects the chassis by reducing vibration when the chassis folds.

Figure 4:
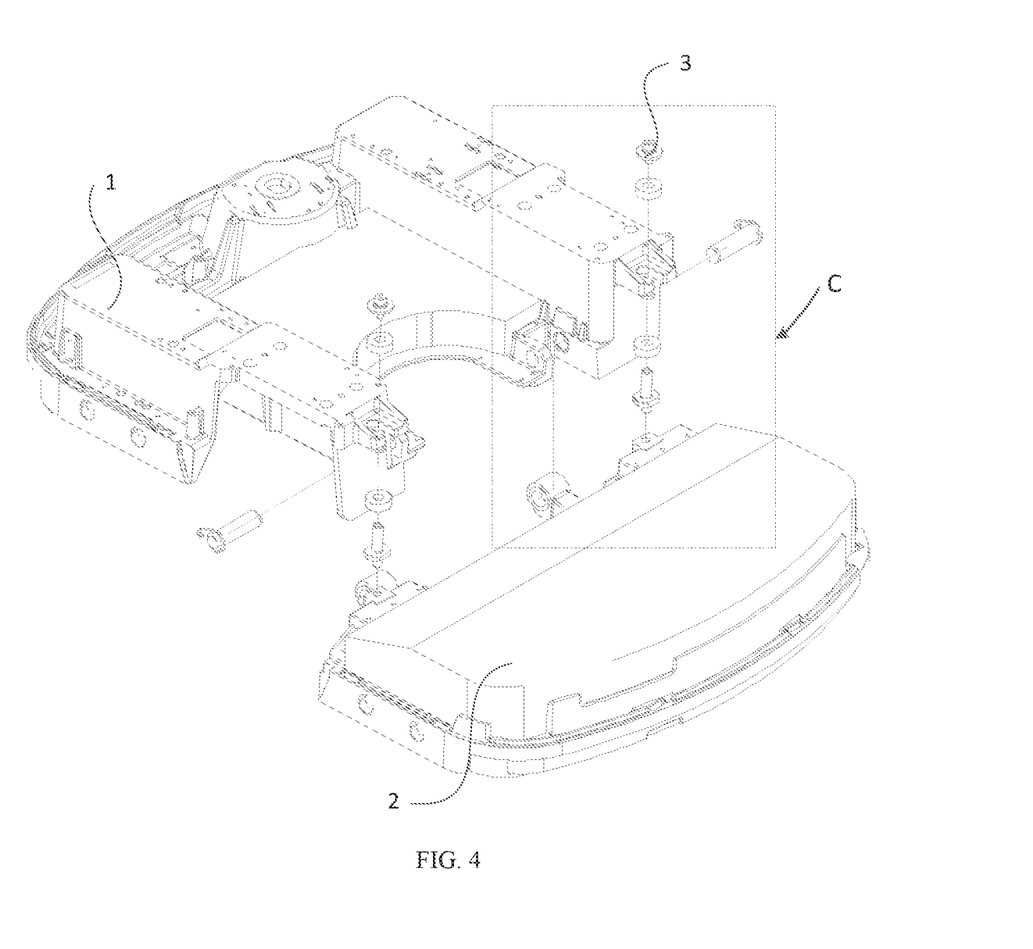
FIG. 4 is an exploded view of the chassis of the automated guided vehicle according to the embodiment of the present application.
Figure 5:
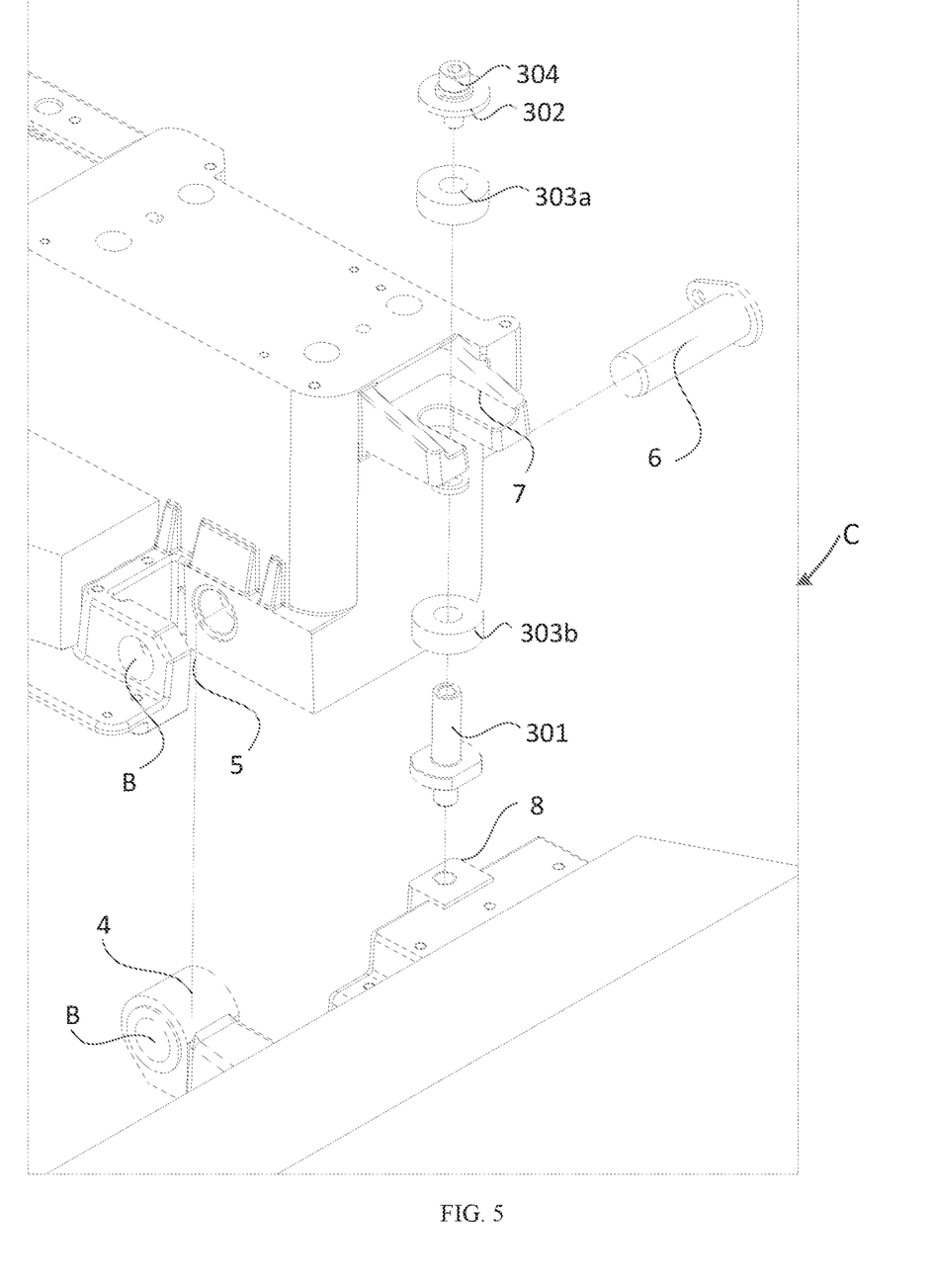
FIG. 5 is a schematic structure diagram of the part C in FIG. 4 according to the embodiment of the present application.
Figure 6:
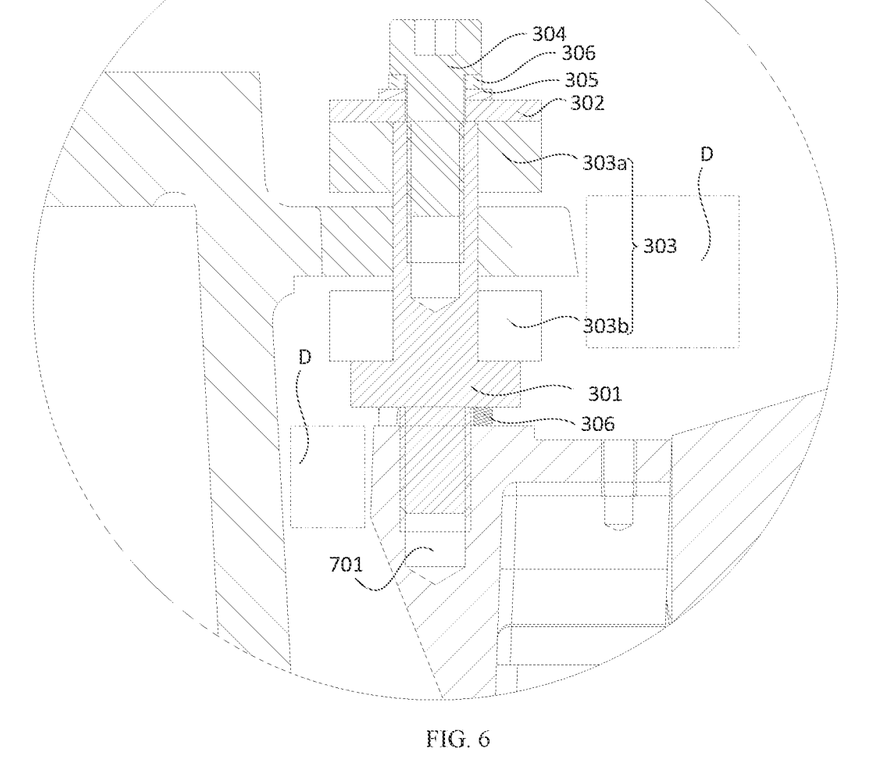
FIG. 6 is a partial cross-sectional view of the part C in FIG. 4 according to the embodiment of the present application.

As shown in FIG. 4, which is an exploded view of the chassis of the automated guided vehicle according to the embodiment of the present application, the part C structure is the partial overlap area at which the front frame 1 engages with the rear frame 2 on one side. In one example, as shown in FIG. 5 and FIG. 6, which are respectively a schematic diagram and a cross-sectional view of the part C structure in FIG. 4, the damping device 3 includes:

a limit shaft 301, the limit shaft 301 penetrating the damping mounting arm 8, and the limit shaft 301 being threadedly connected with the threaded hole 701 of the damping mounting boss 7, and being fixed by means of a backing plate 302; and cushions 303, the cushions 303 including a first cushion 303*a* and a second cushion 303*b*;

wherein, the first cushion 303*a* is located between the backing plate 302 and the damping mounting arm 8, and the second cushion 303*b* is located between the damping mounting arm 8 and the damping mounting boss 7.

The limit shaft 301 of the damping device 3 penetrates the damping mounting arm 8, and the limit shaft 8 is threadedly connected with the damping boss 7, that is, the limit shaft 301 is connected between the front frame 1 and the rear frame 2; and one end of the limit shaft 301 is fixed to the threaded hole 701 of the damping mounting boss 7, and the other end is fixed by means of the backing plate 302 after penetrating the damping mounting arm 8. The backing plate 302 can cover the damping mounting arm 8 to prevent the limit shaft 301 from getting out of the damping mounting arm 8. A first cushion 303*a* is arranged between the backing plate 302 and the damping mounting arm 8, and a second cushion 303*b* is arranged between the damping mounting arm 8 and the damping mounting boss 7. The backing plate 302 and the limit shaft 301 of the damping device 3 define the relative folding space of the damping mounting arm 8 and the damping mounting boss 7 when the front frame 1 and the rear frame 2 are folded, that is, define the folding angle for the relative folding of the front frame 1 and the rear frame 2. When the front frame 1 and the rear frame 2 are folded, due to the existence of the cushion 303, the damping mounting arm 8 and the damping mounting boss 7 apply the pressure to the cushion 303, which causes the cushion 303 to be compressed and deformed. the compression and deformation of the cushion 303 damps the folding of the front frame 1 and the rear frame 2, and at the same time prevents that the front frame 1 and the rear frame 2 produce vibration when they are folded due to the deformation happening too fast, that is, the cushion 303 has a function of vibration reduction. Preferably, the material of the cushion 303 can be selected as rubber or polyurethane with elasticity.

As shown in FIG. 6, the folding space D not only includes the space between the front frame 1 and the damping device 3, but also includes the space between the damping device 3 and the rear frame 2. These two spaces ensure the realization of the folding angle.

Figure 7:
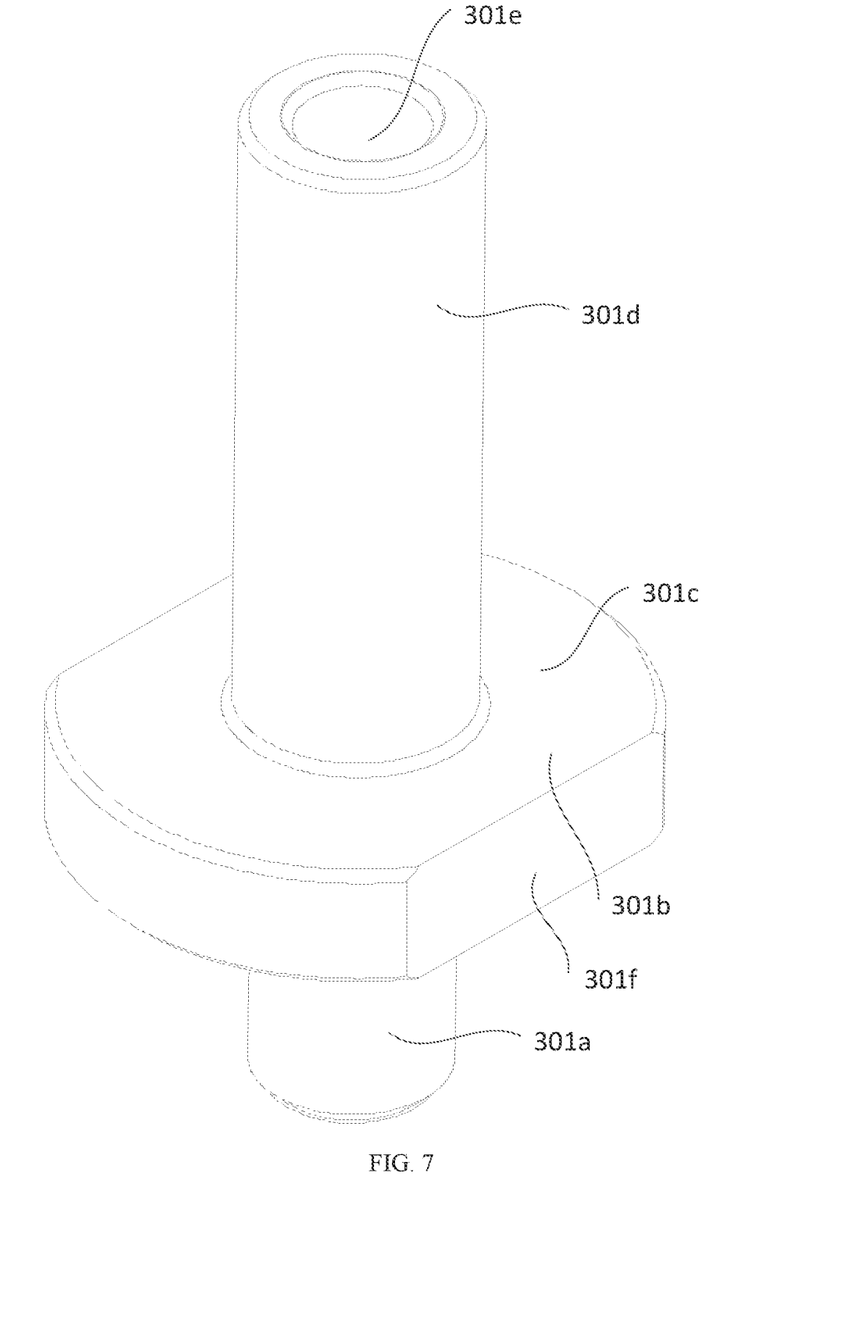
FIG. 7 is a schematic structural diagram of a limit shaft according to the embodiment of the present application.
Figure 8:
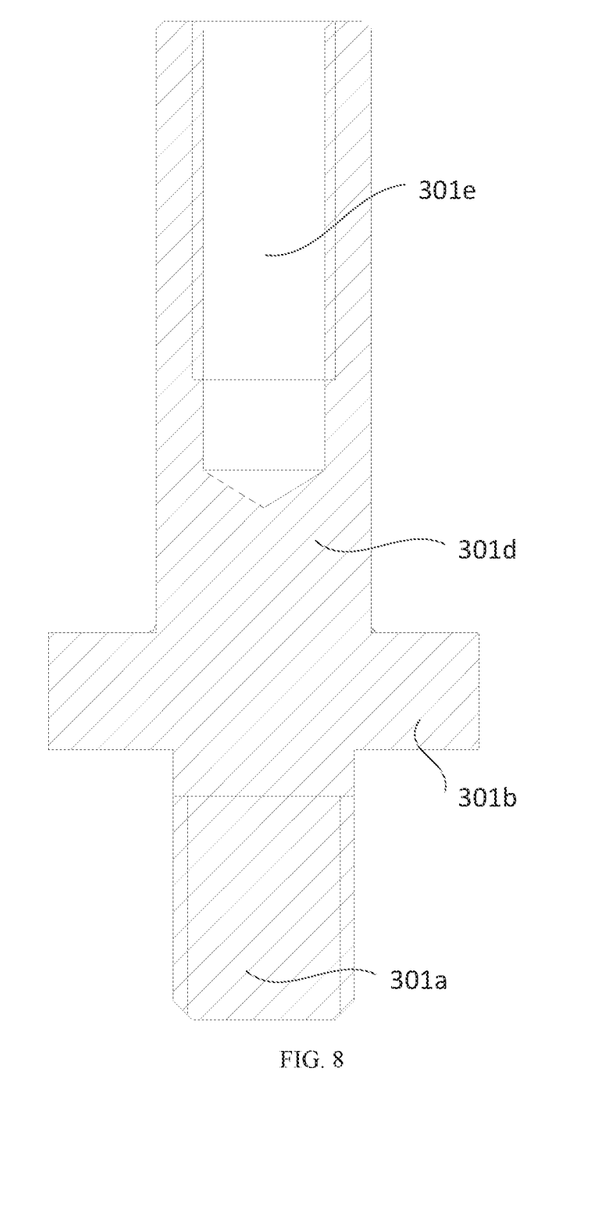
FIG. 8 is a cross-sectional view of the limit shaft according to the embodiment of the present application.

Furthermore, as shown in FIGS. 7 and 8, which are respectively a schematic structural diagram and a cross-section diagram of the limit shaft, the limit shaft 303 includes:

a threaded portion 301*a*, the threaded portion 301*a* being threadedly connected with the threaded hole 701 of the damping mounting boss 7, that is, the limit shaft 301 is fixedly and threadedly connected with the damping mounting boss 7.

a limiting boss 301*b*, the limiting boss 301*b* being located between the damping mounting arm 8 and the damping boss 7, and providing a placement plane 301*c* for the second cushion 303*b*; the limiting boss 301*b* restricts the relative folding of the damping mounting arm 8, so that the relative folding of the front frame 1 and the rear frame 2 may not generate too large angle; and a connecting portion 301*d*, the connecting portion 301*d* penetrating the damping mounting arm 8, and being fixed by means of the backing plate 302. The connecting portion 301*d* provides a mounting position for the backing plate 302 and the damping mounting arm 8, that is, the connecting portion 301*d* extends beyond the damping mounting arm 8.

Wherein, the connecting portion 301*d* is provided with a threaded blind hole 301*e* extending in its own axial direction and used for mounting a locking screw 304. The connecting portion 301*d* is provided with a threaded blind hole 301*e*, which is used for mounting the locking screw 304. The locking screw 304 is used for locking the backing plate 302 to fix the first cushion 303*a*.

In one optional example, the limiting boss 301*b* of the limit shaft 301 is symmetrically arranged on the clamping plane 301*f*. The clamping plane 301*f* can facilitate the screwing of the limit shaft 301 to realize the threaded mounting of the limit shaft 301 when the limit shaft 301 is mounted by using a mounting tool such as a wrench.

In one example, in order to fix the backing plate 302, a fastening cushion 305 is arranged between the locking screw 304 and the backing plate 302. The fastening cushion 305 increasing the contact area between the locking screw 304 and the backing plated 302, on one hand, realizes the fastening of the backing plate 302 to prevent the backing plate 302 from getting out, and on the other hand, prevents the damage to the backing plate 302 due to the too large pre-tightened force when the locking screw 304 contacts with the backing plate 302.

In another example, a locking washer 306 is arranged between the locking screw 304 and the fastening cushion 305. The locking washer 306 cooperates with the locking screw 304 to prevent the loosening of the threaded connection between the locking screw 304 and the limit shaft 301, which realizes the fastening of the locking screw 304. In the same way, a locking washer 306 is arranged between the limiting boss 301*b* of the limit shaft 301 and the damping boss 7, which performs the fastening of the threaded connection between the locking washer 306 and the limit shaft 301.

In one optional embodiment, as shown in FIG. 1, a circular hollow A is formed in a position at which the front frame 1 engages with the rear frame 2. It can be understood that, the circular hollow A, on one hand, reduces the weight of the chassis, enabling the chassis much lighter and thus reducing the energy consumption of the vehicle' own weight during transportation, and on the other hand, under the condition of removing the same volume, the horizontal dimension of the chassis occupied by the circular hollow A is smaller than other forms of hollow, so that more pieces can be arranged around the circular hollow to increase the compactness of the entire chassis. Also, the axis of the hollow axis coincides with the center line of the chassis in the height direction. In the case of the same length of the vehicle, the vehicle with the circular hollow A will have smaller radius of gyration, which means the pieces of the chassis have higher density and compactness in the circumferential direction of the circular hollow A. Preferably, the front frame 1 of the chassis has more than half part of the circle of the circular hollow A, and the rear frame 2 has less than part of the circle of the circular hollow A. Both the opposite surfaces of the front frame 1 and the rear frame 2 at the circular hollow A are arc surfaces.

In one example of the above-mentioned embodiments, the front frame 1 and the rear frame 2 are hinged by a pin shaft 6. The pin shaft 6 allow the relative folding between the front frame 1 and the rear frame 2, and the pin shaft 6 can serve as the rotating shaft for the relative folding of the front frame 1 and the rear frame 2. Each of the pin shaft 6 is convenient to mount and remove, and not occupy much more space. Optionally, the pin shaft 6 can be used in pairs, oppositely mounted and the pin shaft 6 in pairs are respectively positioned on the left and right sides of the chassis and arranged symmetrically. The pin shaft 6 used in pairs and arranged symmetrically enables the pin shaft 6 cannot occupy the middle space of the chassis at the position of engaging, that is, the pin shaft 6 cannot occupy the space of the circular hollow A, ensuring the overall symmetry of the chassis and further reducing the radius of gyration of the chassis.

In one example, the front frame 1 is provided with one of a engaging block 4 and a engaging groove 5, and the rear frame 2 is provided with the other of the engaging block 4 and the engaging groove 5; the engaging block 4 is embedded in one engaging groove 5, and the engaging block 4 can rotate relative to the engaging groove 5; the pin shaft 6 penetrate the coaxial holes of the engaging block 4 and the engaging groove 5. The engaging block 4 matches with one engaging groove 5, the front frame 1 provided with a engaging block 4 or a engaging grooves 5, and the rear frame 2 is provided with a engaging groove 5 or a engaging block 4 such that the engaging block 4 can be embedded in the engaging groove 5, realizing the connection of the front frame 1 and the rear frame 2. Also, coaxial holes B are provided in the engaging block 4 and the engaging groove 5. The coaxial holes B can be mounted with the pin shaft 6. Each of the pin shaft 6 mounted in the coaxial holes B is used as the rotating shaft for the relative folding of the front frame 1 and the rear frame 2. The engaging block 4 and the engaging groove 5 both rotating around the pin shaft 6 realizes the relative folding of the front frame 1 and the rear frame 2.

Figure 9:
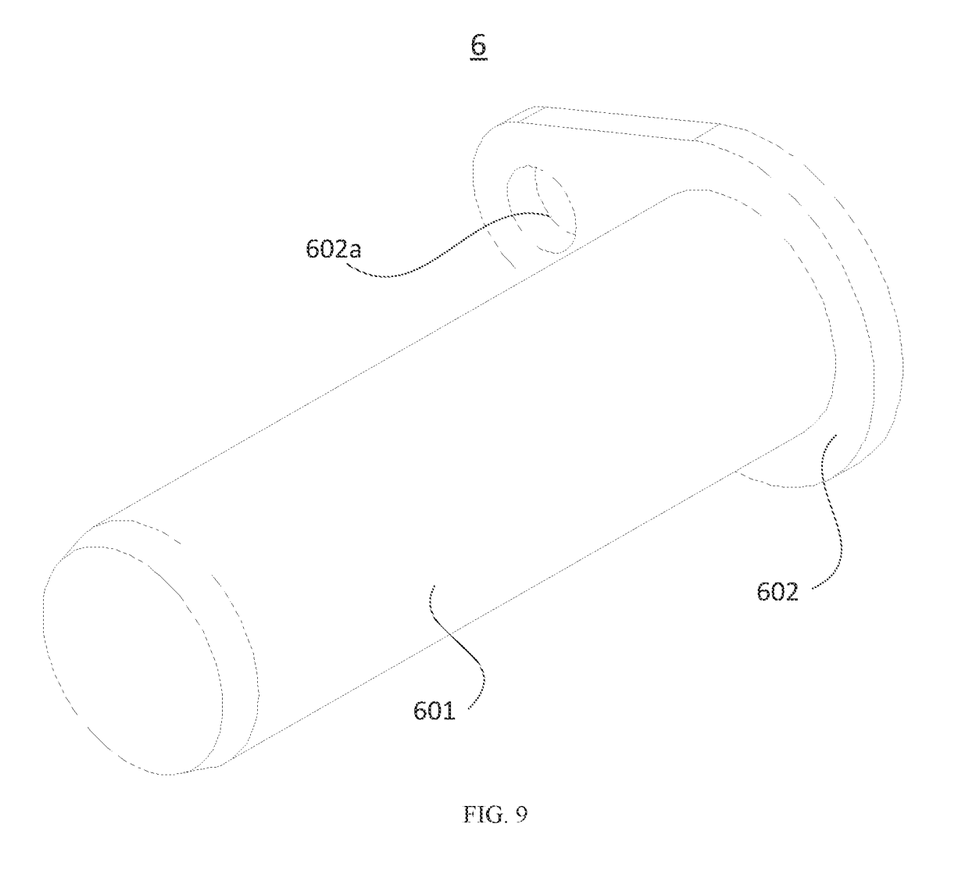
FIG. 9 is a schematic structural diagram of a pin shaft according to the embodiment of the present application.

Specifically, as shown in FIG. 9, each pin shaft 6 has a pin 601 and a connecting piece 602 located at the end of the pin 601, wherein the pin 601 penetrates the coaxial hole B of the engaging block 4 and the engaging groove 5 as shown in FIG. 5, and the connecting piece 602 is fixed to the front frame 1 or the rear frame 2. The pin 601 of the pin shaft 6 is used as the rotating shaft for the relative rotating of the engaging block 4 and the engaging groove 5, as a result, it penetrates the coaxial hole B, realizing the relative folding of the front frame 1 and the rear frame 2. Preferably, the connecting piece 602 is fixed to the front frame 1 by bolts.

For example, the connecting piece 602 is provided with a via 602a, the front frame 1 is provided with a matching hole. The bolt is fixed by a nut after penetrating the holes of the via 602a and the front frame 1, realizing the fixing of the pin shaft 6 to the front frame 1. After the fixing of the pin shaft to the front frame 1, the front frame 1 cannot rotate relative to the pin shaft 6 and only the rear frame 2 can rotate relative to the pin shaft 6, that is, the relative folding of the front frame 1 and the rear frame 2 is realized by the rotating of the rear frame 2 relative to the pin shaft 6.

It can be understood that the front frame 1 is mounted with driving wheels 9 and the driven wheel 10, and the rear frame 2 is mounted with the driven wheel 10. In use, the front frame 1 drives the rear frame 2 to move forward. When encountering uneven roads, the rear frame 2 is folded relative to the front frame 1. The driven wheels 10 may be universal wheels, which can realize rotating and steering while sharing the load of the driving wheels.

The embodiment of the present application further provides an automated guided vehicle, which includes the above-mentioned chassis of the automated guided vehicle. A relative folding can generate between the front frame 1 and the rear frame 2 of the chassis of the transport vehicle. The relative folding enables the driving wheels and the driven wheels to touch the ground on a sunken road at the same time to prevent that only the driven wheels touch the ground while the driving wheels slip, and increases the approach angle of the chassis on a convex road to prevent the front end of the chassis from touching any obstacle, which improve the safety of the vehicle. Moreover, the damping device 3 restricts the folding angle of the front frame 1 and the rear frame 2 to prevent that the relative folding angle of the front frame and the rear frame is too large to realize the transport function, and damps the folding angle for reducing vibration to prevent the damage to the chassis due to the excessive vibration when the folding generates on an uneven road.

It can be understood that the chassis and frame in this application are different concepts. The chassis includes a front frame, a rear frame, and driving wheels, etc. and the range of the chassis is wider than that of the frame.

It should be understood that although this specification is described in accordance with each embodiment, not each embodiment only contains an independent technical solution. This narration in the specification is only for clarity, and those skilled in the art should regard the specification as a whole. The technical solutions in the various embodiments can also be appropriately combined to form other embodiments that can be understood by those skilled in the art The above descriptions are only the preferred embodiments of the present application and are not intended to limit this application. Any modification, equivalent replacement, improvement, etc. made within the spirit and principle of the present application shall be included in the scope of the present application.

The invention claimed is:

1. A chassis of an automated guided vehicle, comprising:
   a front frame (1);
   a rear frame (2), wherein the rear frame (2) engages with the front frame (1) in a hinge joint manner to allow relative folding between the rear frame (2) and the front frame (1); and
   a damping device (3) that is arranged between the front frame (1) and the rear frame (2) for generating a damping restraining force against the relative folding;
   wherein an overlap area is provided in a position at which the front frame (1) engages with the rear frame (2), and a folding space (D) is reserved in the overlap area for realizing the relative folding; and
   wherein the damping device (3) is located in the overlap area.

2. The chassis of an automated guided vehicle according to claim 1, wherein the relative folding comprises upwarping or downwarping of the front frame (1) relative to the rear frame (2).

3. The chassis of an automated guided vehicle according to claim 1, wherein the front frame (1) hinges with the rear frame (2) in a towed manner.

4. The chassis of an automated guided vehicle according to claim 1, wherein the front frame (1) is provided with one of a damping mounting boss (7) and a damping mounting arm (8), and the rear frame (2) is provided with the other one of the damping mounting boss (7) and the damping mounting arm (8);

the damping mounting arm (8) overlaps with the damping mounting boss (7), and the folding space (D) is located between the damping mounting arm (8) and the damping mounting boss (7); and one end of the damping device (3) is fixed on the damping mounting arm (8), and the other end of the damping device (3) is fixed on the damping mounting boss (7).

5. The chassis of an automated guided vehicle according to claim 4, wherein the damping device (3) comprises:

a limit shaft (301) that penetrates the damping mounting arm (8) and is threadedly connected with a threaded hole (701) of the damping mounting boss (7), and is fixed on the damping mounting boss (7) by means of a backing plate (302); and cushions (303), comprising a first cushion (303a) and a second cushion (303b);

wherein, the first cushion (303a) is located between the backing plate (302) and the damping mounting arm (8), and the second cushion (303b) is located between the damping mounting arm (8) and the damping mounting boss (7).

6. The chassis of an automated guided vehicle according to claim 5, wherein the limit shaft (301) comprises:

a threaded portion (301a), that is threadedly connected with the threaded hole (701) of the damping mounting boss (7);

a limiting boss (301b), that is located between the damping mounting arm (8) and the damping mounting boss (7), and provides a placement plane (301c) for the second cushion (303b); and a connecting portion (301d), that penetrates the damping mounting arm (8), and is fixed on the damping mounting arm (8) by means of the backing plate (302);

wherein, the connecting portion (301d) is provided with a threaded blind hole (301e) that extends in an axial direction of the threaded blind hole (301e) and is used for mounting a locking screw (304).

7. The chassis of an automated guided vehicle according to claim 1, wherein a circular hollow (A) is formed at the position at which the front frame (1) engages with the rear frame (2).

8. The chassis of an automated guided vehicle according to claim 1, wherein the front frame (1) hinges with the rear frame (2) by a pin shaft (6).

9. The chassis of an automated guided vehicle according to claim 8, wherein the front frame (1) is provided with one of an engaging block (4) and an engaging groove (5), and the rear frame (2) is provided with the other one of the engaging block (4) and the engaging groove (5);

the engaging block (4) is embedded in the engaging groove (5); and the pin shaft (6) penetrates a coaxial hole (B) of the engaging block (4) and the engaging groove (5).

10. The chassis of an automated guided vehicle according to claim 9, wherein the pin shaft (6) has a pin (601) and a connecting piece (602) located at the end of the pin (601), wherein the pin (601) penetrates the coaxial hole (B) of the engaging block (4) and the engaging groove (5), and the connecting piece (602) is fixed to the front frame (1) or the rear frame (2).

11. An automated guided vehicle, comprising the chassis of an automated guided vehicle according to claim 1.

* * * * *